United States Patent [19]

Longazel

[11] Patent Number: 5,513,412
[45] Date of Patent: May 7, 1996

[54] RUMBLE STRIP FOR WINDSHIELD WIPER BLADE HAVING AN ADJUSTABLE LENGTH

[76] Inventor: Thomas W. Longazel, 127 Butler St., Ebensburg, Pa. 15931

[21] Appl. No.: 355,620

[22] Filed: Dec. 14, 1994

[51] Int. Cl.$^6$ .................................. B60S 1/04; A47L 1/00
[52] U.S. Cl. .................. 15/246; 15/250.001; 15/250.19
[58] Field of Search .................. 15/257.01, 246, 15/250.19, 250.001, 236.02, 237, 238, 215, 250.15, 236.08, 112, 113, 250.42, 216, 217; 296/97.23, 95.15, 84.1

[56] References Cited

U.S. PATENT DOCUMENTS

| | | | |
|---|---|---|---|
| 2,512,310 | 6/1950 | Corson | 15/215 |
| 2,604,377 | 7/1952 | Eames | 15/238 |
| 2,974,340 | 3/1961 | Kopczynski | 15/250.001 |
| 3,390,912 | 7/1968 | Stata | 296/97.23 |
| 3,908,222 | 9/1975 | Scott | 15/250.001 |
| 4,177,538 | 12/1979 | Blaiklock et al. | 15/250.42 |
| 4,378,484 | 3/1983 | Kunert | 15/250.001 |
| 4,420,180 | 12/1983 | Dupont | 15/215 |
| 4,685,168 | 8/1987 | Mastromoro | 15/250.001 |
| 4,934,013 | 6/1990 | Jacoby | 15/250.001 |
| 5,226,199 | 7/1993 | Jacoby | 15/250.19 |

FOREIGN PATENT DOCUMENTS

| | | | |
|---|---|---|---|
| 1911991 | 9/1970 | Germany | 15/250.001 |
| 1512327 | 6/1978 | United Kingdom | 15/250.001 |

*Primary Examiner*—Gary K. Graham
*Attorney, Agent, or Firm*—James Ray & Associates

[57] ABSTRACT

Apparatus adapted to be bonded to an outer surface of a vehicle windshield for removing snow, ice and other matter from a windshield wiper blade which has a generally flat, elongated body portion with an elongated under surface and an elongated upper surface, whereby the elongated under surface is adapted to be bonded to an outer surface of a vehicle windshield, and the elongated upper surface is provided with a plurality of spaced, elongated, raised surface portions, longitudinally aligned along the length of the elongated upper surface. Preferably, a separation means is provided approximately mid-way between the adjacent, spaced, elongated, raised surface portions to facilitate separation of the elongated body portion between the adjacent, spaced, elongated, raised surface portions, so that the overall length of the elongated body portion can be selectively reduced prior to bonding to said windshield to more closely match the length of the windshield wiper blade adjacent thereto.

15 Claims, 1 Drawing Sheet

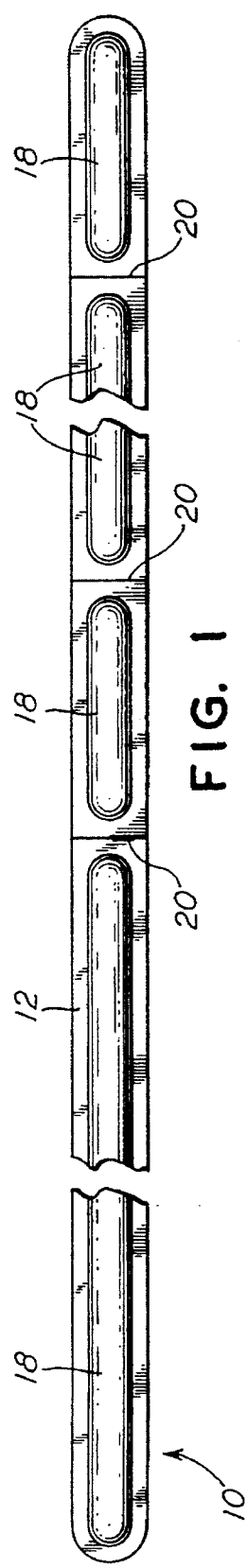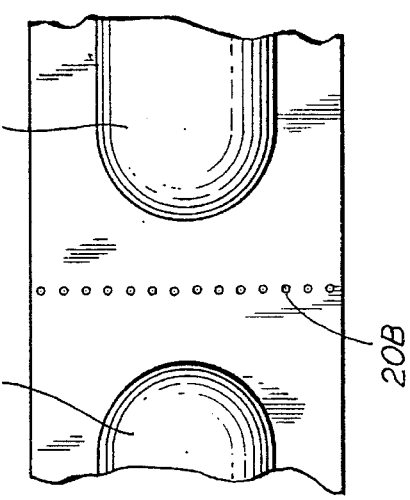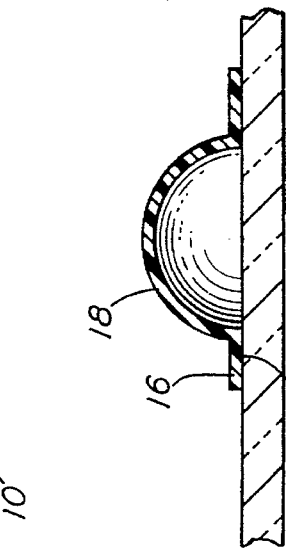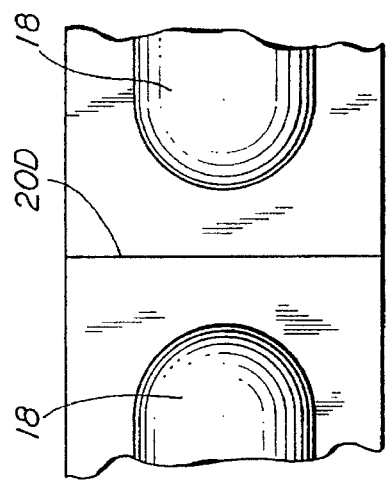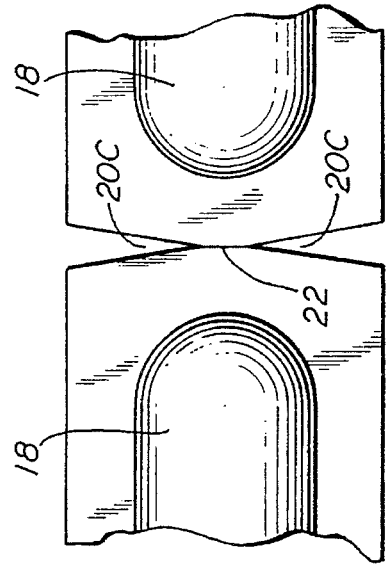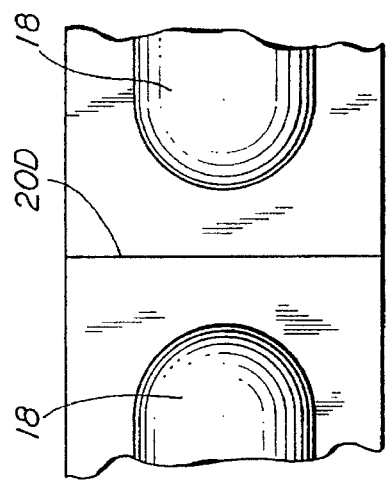

RUMBLE STRIP FOR WINDSHIELD WIPER BLADE HAVING AN ADJUSTABLE LENGTH

FIELD OF THE INVENTION

This invention relates generally to the removal of snow, ice and other matter from a vehicle windshield wiper blade, and more particularly to a unique and novel rumble strip that can be bonded onto a windshield such that the windshield wiper blade will repeatedly pass thereover in its windshield wiping action, thereby causing the wiper blade to be flexed and/or bumped sufficiently to loosen, dislodge and remove snow, ice and other debris adhering thereto, and which can easily be adjusted to have a length that will match, or nearly match, the length of the windshield wiper blade to be affected.

CROSS REFERENCE TO RELATED APPLICATION

The invention taught in this patent application is closely related to the invention taught in applicant's co-pending patent application, titled: "Rumble Strip for Windshield Wiper Blade", Ser. No. 08/208,440, filed Mar. 9, 1994, now U.S. Pat. No. 5,458,690. The teachings in the above-referenced co-pending patent application are incorporated herein by reference thereto as though the specification were fully rewritten herein.

BACKGROUND OF THE INVENTION

Practically all vehicle operators, including automobile and truck driver, as well as other vehicle operators, and particularly those who operate such vehicles in inclement winter weather, have experienced the problem of obstruction to adequate vision when the windshield wiper blades become coated or clogged with snow and ice. It is indeed well known that when operating a vehicle during inclement winter weather, and particularly at times during snow fall or freezing rain, that the windshield wiper blades will tend to become coated with packed show or ice making it very difficult for the windshield wiper blades to adequate clear the windshield. As a consequence, vision through the windshield becomes obstructed and hinders clear vision and safe driving. In such situation, it often becomes necessary for the vehicle operator to stop his vehicle periodically for the purpose of stepping out of the vehicle to dislodge and remove snow and ice accumulations from the windshield wiper blades before proceeding. This becomes necessary not only to satisfy the driver's own feeling of adequate vision and safe driving, but may be necessary from a legal point of view as many states have written regulations or laws regarding the area of windshield that must be cleared least the driver be in violation of such law or regulation. It is further recognized that the need to stop one's vehicle and step outside for the purpose of removing snow and ice from the windshield wiper blades can itself be very dangerous, as obviously, other following drivers will most likely have similar obstructed vision and may not see such a stopped vehicle or the driver standing adjacent thereto cleaning his or her windshield wiper blades.

Applicant's above-cited co-pending patent application, Ser. No. 08/208,440, filed Mar. 9, 1994, teaches and claims apparatus adapted to be bonded onto a vehicle windshield for the purposes of removing snow and/or ice from the windshield wiper blade while the wiper blade is in motion during it normal wiping action. That invention comprises a very simple piece of apparatus, namely a simple rumble strip which is merely an elongated body, which can be secured at an edge of the outer surface of a windshield at a position over which the windshield wiper blade will pass when in the operating mode, or when the wiper switch is turned "on" and "off". The rumble strip has at least one surface sufficiently raised from the outside plane surface of the windshield as will cause the windshield wiper blade to be flexed and/or bumped as it passes thereover. The flexing and/or bumping of the windshield wiper blade will loosen, dislodge and remove at least some of the snow and ice adhering to the windshield wiper blade. Accordingly, the repeated flexing and/or bumping of the windshield wiper blade with each and every pass over the rumble strip will serve to keep the windshield wiper blade relatively clear of accumulated packed snow and ice so that the windshield wiper blade can better function to keep the windshield cleared of vision obstructing water, snow and ice.

For optimum effect, it has been found that the rumble strip should be at least as long as the windshield wiper blade, and bonded to the windshield in a parallel relationship to the wiper blade, so that the full width of the wiper blade will contact the width of the rumble strip with a full length, parallel impact force so that the side of the wiper blade is impacted against and literally bounced over the rumble strip. If the length of the rumble strip is notably less than that of the windshield wiper blade, the wiper blade may be caused bow around the rumble strip as it passes thereover, with a lesser "bounce over" effect, and accordingly, a reduced snow and ice removing capability. If the length of the rumble strip is more than the length of the windshield, to the extent that it extends beyond one or both ends of the wiper blade as the wiper blade passes thereover, then obviously optimum cleaning action will be achieved, but the rumble strip will be longer than necessary, and can therefore, be a visual obstruction to an extent more than necessary.

In preparing to market such rumble strips, it has been found that vehicles on the road today utilize windshield wiper blades having a great variation in length. Some vehicles utilized windshield wiper blades as short as 14 inches, while other utilize wiper blades as long as 24 inches. Furthermore, some vehicles utilize windshield wiper blades that are not matched in length, for example using a 24-inch wiper blade on the driver's side and a 18-inch blade on the passenger side. Still other vehicles utilize a rather long, single, centrally mounted, windshield wiper blade that sweeps the full width of the windshield. Accordingly, to successfully package pairs of rumble strips for sale to the general public as individual vehicle owners, an unreasonable number of lengths and length combinations must be packaged to satisfy most if not all possible vehicle owners.

SUMMARY OF THE INVENTION

This invention is predicated on my conception and development of a rather long rumble strip that can be manufactured and sold for general use that can be easily reduced in length by the purchaser as necessary to match, or more closely match, the length of any shorter windshield wiper blade his vehicle may utilize. As with the prior rumble strip as taught and claimed in co-pending application, Ser. No. 08/208,440, cited above, the inventive apparatus is adapted to be bonded to an outer surface of a vehicle windshield for removing snow, ice and other matter from a windshield wiper blade and comprises a generally flat, elongated body portion having an elongated under surface and an elongated outer surface, with the elongated under surface adapted to be bonded to an outer surface of a vehicle windshield. While the prior rumble strip as taught in the referenced co-pending patent application teaches a single, elongated, raised surface portion extending nearly the full length of the elongated outer surface, the inventive rumble strip of this invention is provided with a plurality of spaced, elongated, raised surface portions longitudinally aligned along the length of the elongated outer surface, with or without additional separation means disposed approximately mid-way between adjacent, spaced, elongated, raised surface portions to facilitate separation of the elongated body between each adjacent, spaced, elongated raised surface portions so that the overall length of the elongated body can be selectively reduced to match, or more closely match, the length of the adjacent wiper blade prior to bonding it to a windshield. Such a separation means can comprise a score line, a line of closely spaced perforations, opposed notches, or any such other means for facilitation fracture, which extends across a width of the elongated body, and which should be sufficient to permit manual fracture of the elongated body at such separation means. If the elongated body is made of plastic or some other cuttable material, the separation means can merely comprise a printed line as a guide for cutting apart the elongated body with a tool such as scissors.

OBJECTS OF THE INVENTION

Accordingly, it is a primary object of this invention not only to provide an apparatus for preventing the accumulation of snow and ice on a windshield wiper blade in amounts sufficient to hinder adequate wiping of the windshield, but also to provide such an apparatus in a marketable form that can be adapted for optimum use with a windshield wiper blade of any normally available length.

It is another object of this invention to provide an apparatus for removing snow, ice and other debris from a windshield wiper blade while such a wiper blade is in the operating mode wiping a windshield, which can be sized for use with windshield wiper blades of different lengths.

A further object of this invention to provide an apparatus for removing snow, ice and other debris from a windshield wiper blade while such a wiper blade is in the operating mode wiping a windshield, which can be easily be cut or fractured to an appropriate length for use with windshield wiper blades of different lengths.

An additional object of this invention to provide an apparatus for removing snow, ice and other debris from a windshield wiper blade while such a wiper blade is in the operating mode wiping a windshield, which can be manually fractured to an appropriate length for use with windshield wiper blades of different lengths.

Still another object of this invention to provide an apparatus for removing snow, ice and other debris from a windshield wiper blade while such a wiper blade is in the operating mode wiping a windshield, which can be packaged and marketed as a "one size fits all", to eliminate the need to package and market such apparatus in a great variety of lengths and length combinations.

An even further object of this invention to provide an apparatus for removing snow, ice and other debris from a windshield wiper blade while such a wiper blade is in the operating mode wiping a windshield, and to simplify manufacture thereof so that only one, or at least a few, lengths thereof need be produced and stocked.

These and other objects and advantages will become apparent from a full understanding of the following detailed description of the invention, particularly when considered in view of the attached figures.

BRIEF DESCRIPTION OF THE DRAWINGS

FIG. 1 is a plan view of a rumble strip in accordance with a presently preferred embodiment of this invention.

FIG. 2 is a sectional view of the rumble strip illustrated in FIG. 1 as positioned on the outside surface of a windshield with the section taken through any of the raised body portions.

FIG. 3 is a partial side view of the rumble strip illustrated in FIG. 1, shown in enlarged scale to better illustrate the separation means between any of the raised body portions, in this case comprising a score line cut into the outer surface of the rumble strip.

FIG. 4 is a partial plan view of a rumble strip in accordance with another embodiment of this invention, again shown in enlarged scale to better illustrate another embodiment of the separation means between any of the raised body portions, in this case comprising a line of closely spaced perforations.

FIG. 5 is another partial plan view of a rumble strip in accordance with still another embodiment of this invention, again shown in enlarged scale to better illustrate a third embodiments of the separation means between any of the raised body portions, in this case comprising a pair of opposed notches within opposed edges of the rumble strip.

FIG. 6 is still another partial plan view like FIGS. 4 and 5, this time illustrating fourth embodiment of the separation means between any of the raised body portions, in this case comprising a line printed on the upper surface of the rumble strip as a guide for cutting apart the rumble strip with a tool.

DESCRIPTION OF THE PREFERRED EMBODIMENTS OF THE INVENTION

Reference to FIG. 1 will illustrate a presently preferred embodiment of this invention in which the inventive rumble strip, generally designated 10, comprises an elongated generally flat body portion 12, having an under surface 14 which is adapted to be bonded to an outer surface of a windshield 14, and also having an elongated outer surface 16. The elongated outer surface 16 is provided with a plurality of hollow, spaced, elongated, raised surface portions 18, longitudinally aligned along the length thereof.

In the presently preferred embodiment illustrated in FIG. 1, the apparatus further preferably includes a separation means 20 disposed approximately mid-way between each adjacent, spaced, elongated, raised surface portion 18, adapted to facilitate separation of the elongated body portion 12 between the adjacent, spaced, elongated, raised surface portions 18, so that the overall length of the elongated body portion 12 can be selectively reduced prior to bonding it to a windshield.

While separation means 20 can comprise any one of a number of different means, a preferred separation means 20 is a score line 20A, shown in greater detail in FIG. 3, which comprises a shallow cut extending across the width of the elongated body, in either the under surface 14 or the outer surface 16, which will provide a stress line sufficient to permit fracture and separation of the elongated body portion 12 at the score line 20A when the elongated body portion is manually bent at the score line 20A. Other such separation means 20 can comprise a line of closely spaced perforations 20B, shown in greater detail in FIG. 4, extending across a width of the elongated body portion 12, which will form a "tear line" permitting one to bend the elongated body portion 12 at the perforations 20B, to achieve a separation by virtue of a fracture or a "tearing apart" separation. As still another example of a preferred separation means 20, a pair of opposed notches 20C, shown in greater detail in FIG. 5, can be provided at the two edges of the elongated body portion 12, which will provide a weakened narrow portion 22, which will facilitate a fracture or a "tearing apart" separation. If the elongated body is made of sheet plastic material, as is preferred, preferably having a thickness of less than one-eighth-inch, or some other material that can be easily cut, the separation means 20 can merely comprise a printed line 20D, shown in greater detail in FIG. 6, as a guide line for cutting apart the elongated body 12 with a tool such as snips or scissors.

While the spaced, elongated raised surface portions 18, can be of any desired individual length, the object of providing such a raised surface portion in individual lengths is to make the individual rumble strip 10 adaptable to match the length of the windshield wiper to be cleaned. Accordingly, the lengths of the individual elongated raised surface portions 18, while not critical, are important to optimize this objective. Specifically, since the shortest windshield wiper blade in common use is about 14 inches in length, it is naturally preferable that the first of such elongated, raised surface portions 18, at a first end of elongated body portion 12, be about 14 inches in length, or at least about 12 inches in length. Accordingly, by separating all other elongated raised surface portion 18 after the first one at about 14 inches in length, the portion remaining will be suitable for use with a 14-inch windshield wiper blade. Windshield wiper blades in common use longer than 14 inches, are normally sized at 2-inch intervals; namely, 16-inch, 18-inch, 20-inch and so on, up to about 24-inch. Ideally therefore, all the other elongated, raised, surface portions 18 after the first one at preferably 14 inches in length, are preferably just short of 2-inches in length so that when combined with the 14-inch portion, the total over-all lengths will be 16 inches, 18 inches, 20 inches, and so on, as necessary to match the more common lengths in common use. With a one-quarter-inch spacing between elongated, raised surface portions 18, it is apparent that ideally length of those other raised surface portions 18 be about one and three-quarter inches in length. In the event a user encounters an unusual length, say 17 inches for example, then a 16-inch or an 18-inch rumble strip 10 can be utilized without any significant loss in efficiency, or without an over-length being sufficient to cause a serious visual obstruction. It should be apparent that the above described length of the elongated, raised, surface portions 18 are the presently preferred sizes, and if desired to meet the need of wiper blades odd inch lengths, the shorter, raised surface portions 18 can be made to be just slightly less than 1-inch. In addition, should automobile manufacturers move towards the general use of windshield wiper blades of other sizes, the preferred lengths of the raised surface portions 18 may have to be varied to meet the differing trends in the industry.

As noted above, the rumble strip 10, is preferably made of a plastic material, such a vinyl, and should have sufficient flexibility to be bonded to a curved windshield, as indeed, practically all current day automobile windshields are curved. While the rumble strip 10 can be formed by molding techniques, such as plastic injection molding, the preferred technique is to press form the body portion 12 from a sheet plastic material; e.g., vinyl, whereby the plurality of spaced, elongated, raised surface portions 18, are embossed therein.

It is of course essential that the raised surface portions 18 be reasonably centered on outer surface 16 with respect to the side surfaces, so that a sufficient flat portion remains on outer surface 16, and particularly on the under surface 14, to permit bonding of under surface 14 to a windshield as is intended. While the spacing between the elongated raised surface portions 18 is not critical, a spacing between one-quarter inch and one-half inch is ideal, so that the elongated raised surface portions 18 will be sufficiently close spaced to provide the wiper blade cleaning function intended, and so that after a separation is made, there will still be a sufficient flat portion remaining at the separated end to be bonded to the windshield.

While practically any adhesive can be utilized to bond the rumble strip 10 to a windshield, including adhesives which the vehicle owner may have at hand, it is preferable that the rumble strip 10 be marketed with a suitable adhesive already applied to under surface 14, such as any suitable contact adhesive provided with a protective cover sheet, so that all the user need to do is adequately clean and prepare the windshield, and then apply and press the rumble strip or strips in the desired location.

As shown in FIG. 2 the preferred surface configuration of the raised surface portions 18 is a half-cylindrical form; i.e., having a uniform half-circular cross-section. While such configuration is not deemed to be critical, the half-cylindrical form as shown, is rather easy to produce as an embossed form in a sheet plastic material, and the rounded, smooth outer surface will serve to minimize any possible damage to the windshield wiper blade impacted with and bounced thereover, and most importantly, will serve to minimize the noise level of such impact and bouncing action.

It should be apparent from the above discussion that a number of other embodiments and modifications could be utilized in the invention as described without departing from the spirit of the invention. As noted above, changing future trends in windshield wiper blade lengths may require changes in the preferred lengths of the raised surface portions 18, as well as the overall length of the rumble strip 10, as manufactured and sold. In addition to the many possible forms such a rumble strip could have, it should be further apparent that the use thereof could be varied significantly, such as providing two or more such rumble strips for each windshield wiper blade. By utilizing such a plurality of rumble strips, different configurations or placements could be incorporated into each so that each will have a particular function; e.g., one which will primarily provide a significant bumping action, and another which will primarily provide a significant flexing action. Clearly, a great number of other embodiments and modifications could be incorporated.

I claim:

1. Apparatus adapted to be bonded to an outer surface of a vehicle windshield for removing snow, ice and other matter from a windshield wiper blade, said apparatus comprising: a generally flat, elongated body having an elongated under surface and an elongated upper surface, said body is of a flexible material, said elongated under surface adapted to be bonded onto an outer surface of said vehicle windshield, said elongated upper surface provided with a plurality of hollow, spaced, elongated, raised surface portions, longitudinally aligned along the length of said elongated upper surface, and a score line provided on one of said under and upper surfaces, extending across a width of said elongated body disposed approximately mid-way between adjacent, spaced ends of said spaced, elongated, raised surface portions, and sufficient to permit manual fracture of said elongated body at said score line.

2. Apparatus adapted to be bonded to an outer surface of a vehicle windshield, according to claim 1, in which said material is sufficiently flexible to permit said elongated body to be bonded to a curved windshield.

3. Apparatus adapted to be bonded to an outer surface of a vehicle windshield, according to claim 1, in which said material is plastic.

4. Apparatus adapted to be bonded to an outer surface of a vehicle windshield, according to claim 3, in which said plastic is vinyl.

5. Apparatus adapted to be bonded to an outer surface of a vehicle windshield, according to claim 3, in which said plastic is a plastic sheet material.

6. Apparatus adapted to be bonded to an outer surface of a vehicle windshield, according to claim 5, in which said plastic sheet material has a thickness of less than about one-eighth inch.

7. Apparatus adapted to be bonded to an outer surface of a vehicle windshield, according to claim 6, in which said plurality of spaced, elongated, raised surface portions longitudinally aligned along the length of said elongated outer surface are embossed within said plastic sheet material.

8. Apparatus adapted to be bonded to an outer surface of a vehicle windshield, according to claim 3, in which said plastic is a molded plastic body.

9. Apparatus adapted to be bonded to an outer surface of a vehicle windshield, according to claim 8, in which said plurality of spaced, elongated, raised surface portions longitudinally aligned along the length of said elongated outer surface are molded into said molded plastic body.

10. Apparatus adapted to be bonded to an outer surface of a vehicle windshield, according to claim 1, in which said elongated under surface is provided with an adhesive material adapted to bond said elongated inner surface onto said outer surface of said windshield.

11. Apparatus adapted to be bonded to an outer surface of a vehicle windshield, according to claim 1, in which said plurality of spaced, elongated, raised surface portions longitudinally aligned along the length of said elongated outer surface, have a generally half-cylindrical outer surface configuration.

12. Apparatus adapted to be bonded to an outer surface of a vehicle windshield, according to claim 1, in which a first of said spaced, elongated, raised surface portions has a length of approximately 14 inches.

13. Apparatus adapted to be bonded to an outer surface of a vehicle windshield, according to claim 1, in which a first of said spaced, elongated, raised surface portions has a length of approximately 14 inches and all other of said spaced, elongated raised surface portions have a length of not more than 2 inches.

14. Apparatus adapted to be bonded to an outer surface of a vehicle windshield, according to claim 13, in which said elongated body has a length of approximately 24 inches, and includes one elongated raised surface portion of approximately 14 inches in length, and a plurality of additional spaced, elongated, raised surface portions of not more than 2 inches in length.

15. Apparatus adapted to be bonded to an outer surface of a vehicle windshield, according to claim 1, in which said plurality of spaced, elongated, raised surface portions are spaced by a distance of from one-quarter-inch to one-inch.

* * * * *

UNITED STATES PATENT AND TRADEMARK OFFICE
CERTIFICATE OF CORRECTION

PATENT NO. : 5,513,412
DATED : May 7, 1996
INVENTOR(S) : Thomas W. Longazel

It is certified that error appears in the above-indentified patent and that said Letters Patent is hereby corrected as shown below:

Column 1, line 32, delete "driver" and insert --drivers--;

column 1, line 40, delete "show" and insert --snow--;

column 1, line 41, delete "adequate" and insert --adequately--.

Column 2, line 26, after "caused", insert --to--.

Column 3, line 43, delete "be", first occurrence.

Column 4, line 27, delete "embodiments" and insert --embodiment--.

Column 5, line 43, after "ideally", insert --the--.

Signed and Sealed this

Fifth Day of November, 1996

BRUCE LEHMAN

*Attest:*

*Attesting Officer*     *Commissioner of Patents and Trademarks*